United States Patent [19]

Ricciardi

[11] 3,710,983
[45] Jan. 16, 1973

[54] PLURAL AUGER MATERIAL HANDLING BLENDING SYSTEM

[76] Inventor: Ronald J. Ricciardi, 193 MacArthur Avenue, Garfield, N.J. 07026

[22] Filed: Aug. 20, 1971

[21] Appl. No.: 173,457

[52] U.S. Cl. ............................... 222/141, 222/241
[51] Int. Cl. ............................................. B67d 5/52
[58] Field of Search............ 222/240, 241, 141, 413; 259/105

[56] References Cited

UNITED STATES PATENTS 3,186,602   6/1965   Ricciardi ........................ 222/241 X
3,439,836   4/1969   Ricciardi ........................ 222/240

Primary Examiner—Stanley H. Tollberg
Attorney—Joseph M. Fitzpatrick et al.

[57] ABSTRACT

A material handling system characterized by a bin for receiving particulate solid material, a chamber connected to said bin for receiving said material, a first auger mounted in said chamber and extending into a transfer conduit connected to said chamber. The first auger has an open helical coil type blade for metering and propelling the material. A blending conduit connected to the transfer conduit for receiving material therefrom and being provided with a second inlet for receiving additional material to be processed, and a lower dispensing outlet. A second auger is mounted in the blending conduit which has an open helical coil type blade and a centrally disposed rod which passes through the center of the first auger and by means of a direct coupled extension through the end wall of the chamber. Means are provided for rotating the rod. A cylindrical drive shaft is threadedly connected to the first auger which passes through the end wall of the chamber and second means are provided for rotating the cylindrical drive shaft independently.

6 Claims, 5 Drawing Figures

3,710,983

PLURAL AUGER MATERIAL HANDLING BLENDING SYSTEM

This invention relates to a system for feeding, blending and dispensing particulate solid material.

Applicant has discovered a novel arrangement of elements combined in such a way as to afford a very economical, efficient and practical solution of the difficulties found in the prior art, as will become apparent as the description proceeds.

Briefly, one form of the present invention contemplates the provision of a new and improved system for feeding, blending and dispensing particulate solid material characterized by a bin having an upper receiving inlet and a lower dispensing outlet for receiving and dispensing particulate material. A chamber connected to the bin for receiving material from the outlet and a first auger mounted in said chamber. A transfer conduit for receiving material from the chamber. A first auger having an open, helical coil type blade extending into said transfer conduit. A blending conduit is connected to the transfer conduit and is disposed in linear coaxial relationship one with respect to the other. The blending conduit is provided with a second inlet and a lower dispensing outlet. A second auger is mounted in the blending conduit which has an open helical coil type blade. A centrally disposed rod is provided for carrying the second auger and passes through the center of the first auger, and being provided with a direct coupled extension which passes through the end wall of the chamber. Means are provided for rotating said rod. A cylindrical drive shaft is connected threadedly to the first auger and passes through the end wall of the chamber. Second means are provided for separately rotating the cylindrical drive shaft.

The present invention provides a new and improved system which combines feeding, blending, compounding, metering and dispensing particulate solid material, which is continuous, which is compact, which handles heretofore difficult to handle material, which is easy to clean and which may be fabricated from sanitary materials.

Related patents in this art include U.S. Pat. No. 3,186,602 which issued June 1, 1965 and U.S. Pat. No. 3,439,836 which issued Jan. 27, 1967.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

One embodiment of the invention has been chosen for purposes of illustration and description and is shown in the accompanying drawings, forming a part of the specification, wherein:

FIG. 4 is an enlarged end view of the material handling system; and

FIG. 5 is an enlarged perspective view partially broken away to reveal the inside of the blending conduit portion of the material handling system.

Figure 1:
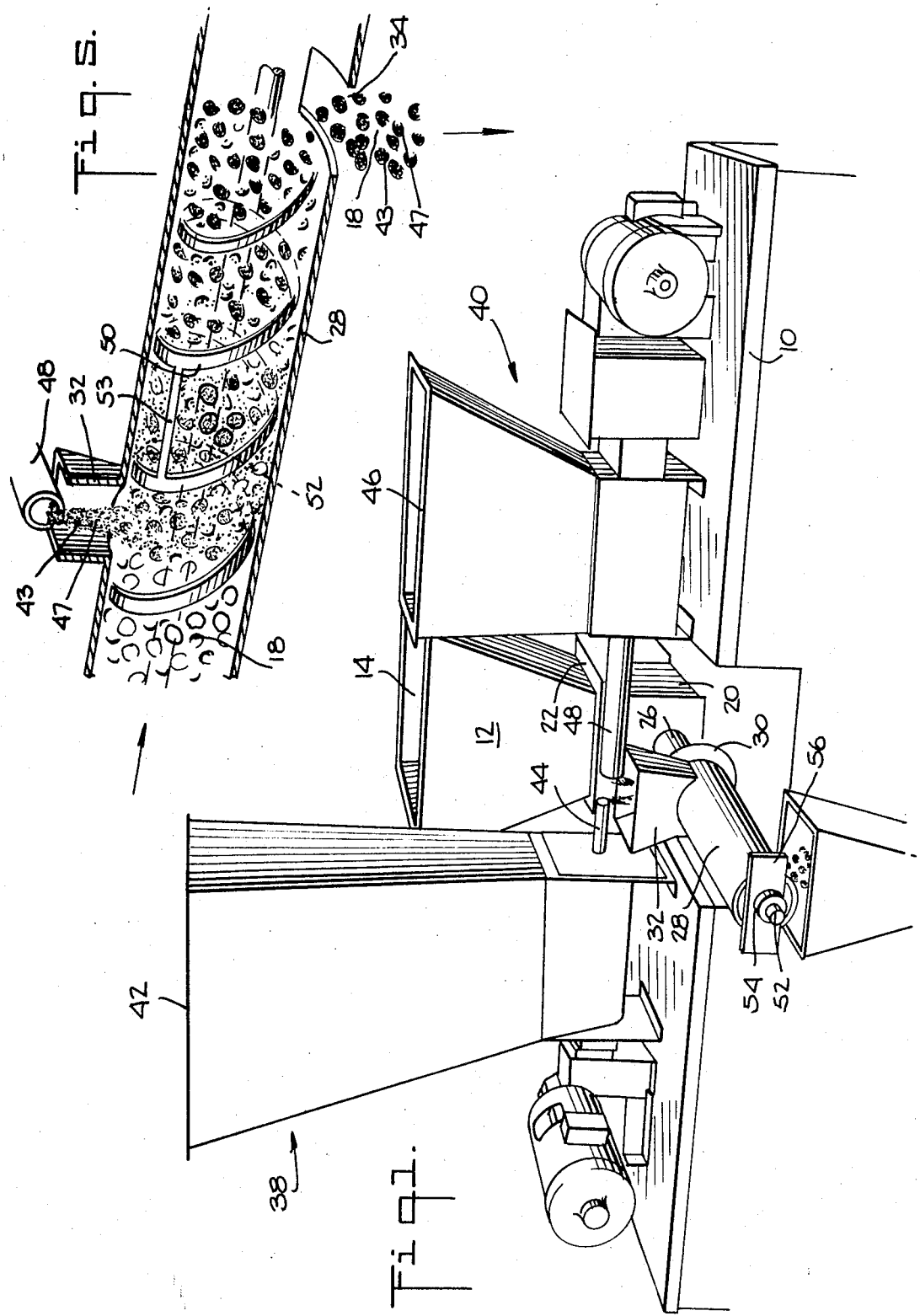
FIG. 1 is a perspective view of the material handling system constructed according to the concept of this invention.
Figure 2:
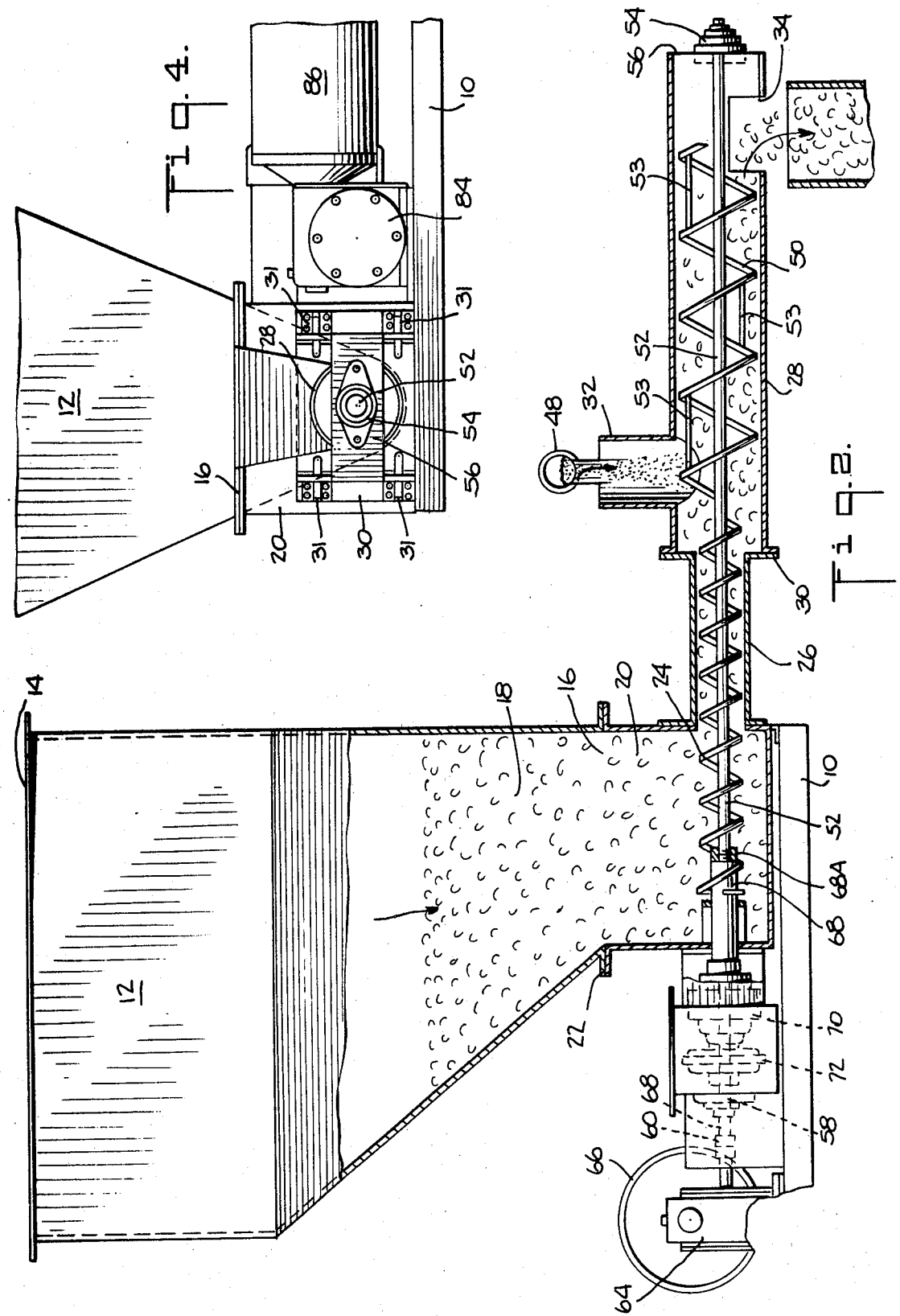
FIG. 2 is an enlarged longitudinal, medial, sectional view showing the internal elements of the structure of FIG. 1.

In the illustrated embodiment of the invention, the blending system includes a frame 10, FIGS. 1 and 2, on which is mounted a bin 12 having an upper receiving inlet 14 and a lower dispensing outlet 16 for receiving and dispensing particulate material 18, FIG. 2. As best seen in FIGS. 1 and 2, the bin 12 may have inwardly, downwardly tapered sidewalls to promote flow of the particulate material towards the lower dispensing outlet. A chamber 20, FIG. 2, is connected to the bottom of the bin 12, as at 22, for receiving material from the lower dispensing outlet 16.

Still referring to FIG. 2, the chamber 20 contains a first horizontally disposed metering auger 24 which is centrally positioned within the chamber and extends outwardly through a transfer conduit 26. The auger 24 is provided with an open, helical, coil type blade for metering and propelling a selected quantity of material toward and through the transfer conduit 26 in response to rotation of the auger.

Figure 3:
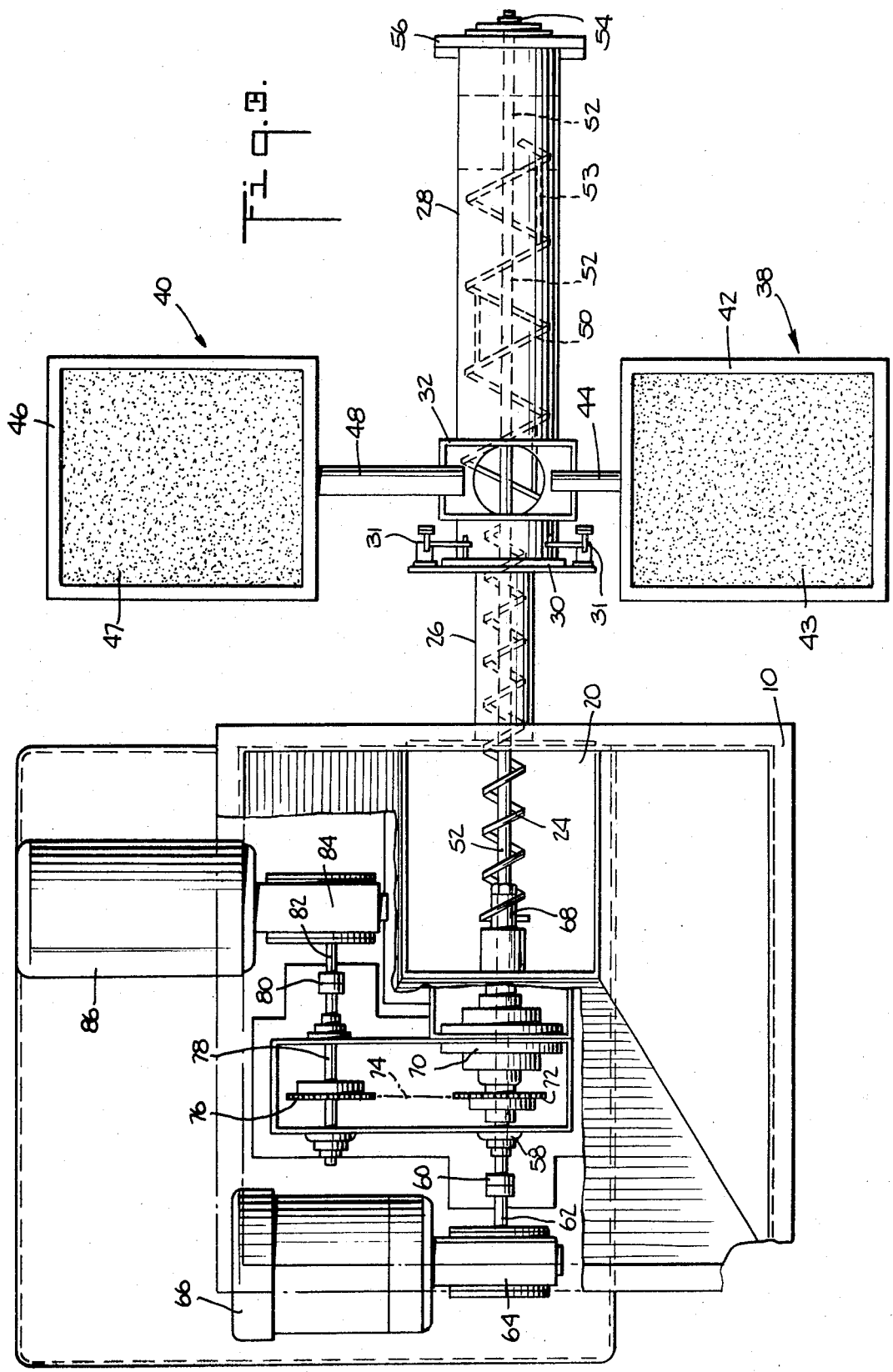
FIG. 3 is an enlarged top plan view of the material handling system.

As seen in FIGS. 1–3, a blending conduit 28 is connected to the transfer conduit 26, as at 30, for receiving material therefrom. Clamps 31, FIG. 3, provide for quick removal of the blending conduit. The transfer conduit 26 and the blending conduit 28 are in linear coaxial relationship one with respect to the other. The blending conduit is provided with a blender collecting hopper 32 and a lower dispensing outlet 34, FIG. 2.

The inlet hopper 32, FIGS. 1 and 3, receives material from one or more volumetric type feeders such as indicated generally at 38 and 40, the feeder 38 being provided with an upper inlet 42 for receiving material 43 to be processed and a lower dispensing outlet 44 for dispensing the material into the blender collecting hopper 32, and the feeder 40 being provided with an upper inlet 46 for receiving material 47 to be processed and a lower dispensing outlet 48 for dispensing the material into the blender collecting hopper 32. A suitable type of volumetric feeder for this purpose is described in detail in U.S. Pat. No. 3,186,602 issued June 1, 1965.

As an example of an application of the present system, virgin resin pellets may be supplied from bin 12, FIG. 2, through transfer conduit 26 while simultaneously color concentrates and other additives may be supplied from the volumetric feeders 38 and 40 through the blender collecting hopper 32. This combination of material is blended while being passed through the blending conduit 28 by means of a second or blending auger 50. The auger 50 is provided with an open, helical coil type blade which is fixedly attached to a centrally disposed rod 52. Bars 53 serve to increase the blending action. This auger is rotated at a constant rotational speed by means of the rod 52. The length of the blending conduit 28 and the rotational speed of the auger are preselected depending upon the type of material being handled so that the material being discharged through the dispensing outlet 34 is completely blended. It will be appreciated that if the material being processed is a resin, the dispensing hopper may be discharged over an extruder or injection molding machine, for example.

As best seen in FIGS. 2 and 4, the rod 52 is mounted in bearings 54 carried by an outer end cap 56 at the end of the blending conduit 28. The other end of the rod 52 passes through the center of the first auger 24 without touching same and is threadedly connected to a threaded drive shaft 68A. This threaded connection permits easy removal of the blending auger 50 for cleaning purposes. A coupling 60 couples the drive shaft 68A to a transmission shaft 62 which extends from a gear transmission 64 connected to a constant speed electric motor 66.

The first or metering auger 24 is fixedly connected by threads to and driven by a cylindrical and independent drive shaft 68, FIG. 3, which passes through the end wall of the chamber 20 and is supported by means of bearings 70. The threaded connection permits easy removal of the metering auger 24 for cleaning purposes. A gear 72 is mounted on the shaft 68 and carries a chain 74 which is also carried by a second spaced gear 76 mounted on a shaft 78, the shaft 78 being driven through a coupling 80 by a shaft 82 extending from a gear transmission 84 connected to a variable speed motor 86. It will be appreciated that the flow of material 18 being fed to the blending conduit 28 from the bin 12 is controlled by the variable speed motor 86 and material 43 and 47 being fed by the feeders 38 and 40 is controlled by the feeders themselves so that the desired quantity and ratios are obtained. The material being blended is passed through the blending conduit by the constant speed auger 50. It will thus be seen that the present invention does indeed provide an improved material handling system which is superior in simplicity, economy and efficiency as compared to prior art such systems.

Although a particular embodiment of the invention is herein disclosed for purposes of explanation, various modifications thereof, after study of the specification, will be apparent to those skilled in the art to which the invention pertains.

What is claimed and desired to be secured by letters patent is:

1. A material handling blending system comprising a frame, a bin mounted on said frame, said bin having an upper receiving inlet and a lower dispensing outlet for receiving and dispensing particulate material, a chamber connected to said bin for receiving material from said outlet, a first auger mounted in said chamber, a transfer conduit for receiving material from said chamber, said first auger extending into said transfer conduit, said auger having an open helical coil type blade for metering and propelling material toward and through said transfer conduit in response to rotation of said auger, a blending conduit connected to said transfer conduit for receiving material therefrom, said transfer conduit and said blending conduit being in linear coaxial relationship one with respect to the other, said blending conduit being provided with a second inlet and a lower dispensing outlet, a second auger mounted in said blending conduit, said second auger having an open helical coil type blade, a centrally disposed rod for carrying said second auger, said rod passing through the center of said first auger, first independent motive means for driving said rod, a cylindrical independent drive shaft connected to said first auger, said cylindrical drive shaft passing through the end wall of the chamber, second independent motive means for driving said cylindrical drive shaft.

2. A material handling blending system according to claim 1 further comprising a plurality of volumetric type feeders, each of said feeders having an upper inlet for receiving material to be processed and a lower dispensing outlet for dispensing material into said second inlet of the blending conduit.

3. A material handling blending system according to claim 1 wherein said chamber is an elongated, substantially horizontally disposed chamber and said transfer conduit is an elongated, substantially horizontally disposed conduit and said first auger is longitudinally mounted in said chamber, said blending conduit being a horizontally, elongated conduit and said second auger being longitudinally disposed therein.

4. A material handling blending system according to claim 1 wherein said blending conduit has an outer end cap and a bearing mounted therein for supporting one end of the rod including a constant speed motor, a gear transmission driven by said motor, a transmission shaft driven by said transmission, a coupling driven by said transmission shaft, a drive shaft driven by said coupling, and said rod being threadedly connected to said drive shaft adjacent said conditioning chamber, said rod being driven by said drive shaft, and wherein said second motive means comprises a gear mounted on said cylindrical drive shaft, a spaced second gear shaft, a second gear carried by said second gear shaft, chain means carried by said gears, a second gear transmission having a second drive shaft extending therefrom, second coupling means connecting said second drive shaft with said second gear shaft, and a variable speed motor for driving said second gear transmission, said cylindrical independent drive shaft being threadedly connected to said first auger.

5. A material handling blending system according to claim 1 wherein said first motive means for driving said rod includes a constant speed motor, and wherein second motive means for driving said cylindrical shaft includes a variable speed motor.

6. A material handling blending system comprising a frame, a bin mounted on said frame, said bin having an upper receiving inlet and a lower dispensing outlet for receiving and dispensing particulate material, en elongated chamber connected to the bottom of said bin for receiving material from said outlet, a substantially horizontally disposed first auger longitudinally mounted in said chamber, an elongated transfer conduit for receiving material from said chamber, said first auger longitudinally extending into said transfer conduit, said auger having an open helical coil type blade for metering and propelling material toward and through said transfer conduit in response to rotation of said auger, a blending conduit, quick release clamping means for connecting the blending conduit to said transfer conduit for receiving material therefrom, said transfer conduit and said blending conduit being in linear coaxial relationship one with respect to the other, said blending conduit being provided with a blender collecting hopper and a lower dispensing outlet, a plurality of volumetric type feeders, each of said feeders having an upper inlet for receiving material to be processed and a lower dispensing outlet for dispensing material into said blender collecting hopper of the blending conduit, a second auger longitudinally mounted in said blending conduit, said second auger having an open helical coil type blade, a centrally disposed rod for carrying and driving said second auger, said blending conduit having an outer end cap, a bearing mounted in said end cap for supporting one end of said rod, the other end of said rod passing through the center of said first auger without touching same, a drive shaft threadedly connected to said rod adjacent the end wall of said chamber, a gear transmission having a transmission shaft extending therefrom, a first coupling for connecting said transmission shaft to said drive shaft, a constant speed motor for driving said gear transmission; a cylindrical drive shaft threadedly connected to said first auger, said cylindrical drive shaft passing through the end wall of the chamber, bearing means for supporting said cylindrical drive shaft, a gear mounted on said cylindrical drive shaft, a spaced second gear shaft, a second gear carried by said second gear shaft, chain means carried by said gears, a second transmission having a second drive shaft extending therefrom, second coupling means connecting said second drive shaft with said second gear shaft, and a variable speed motor for driving said second gear transmission.

* * * * *